United States Patent Office 3,605,958
Patented Sept. 20, 1971

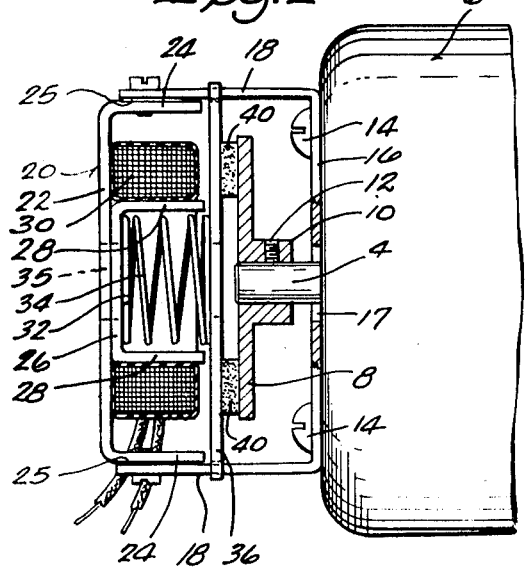
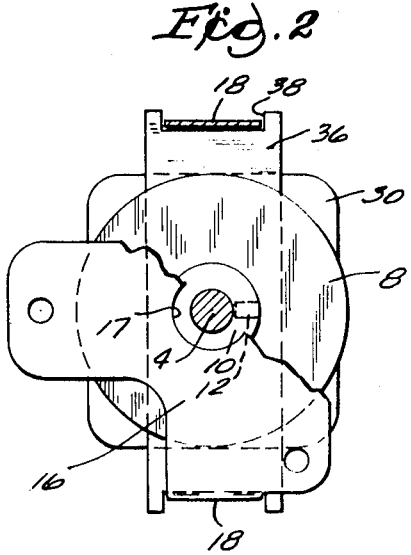
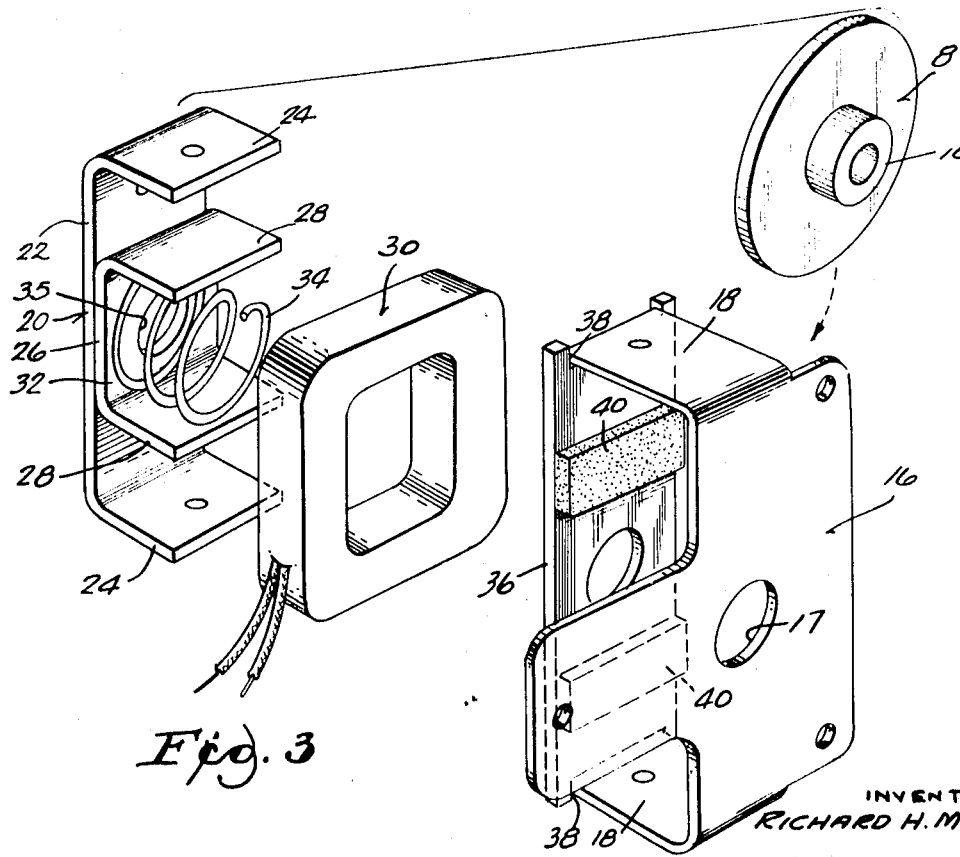

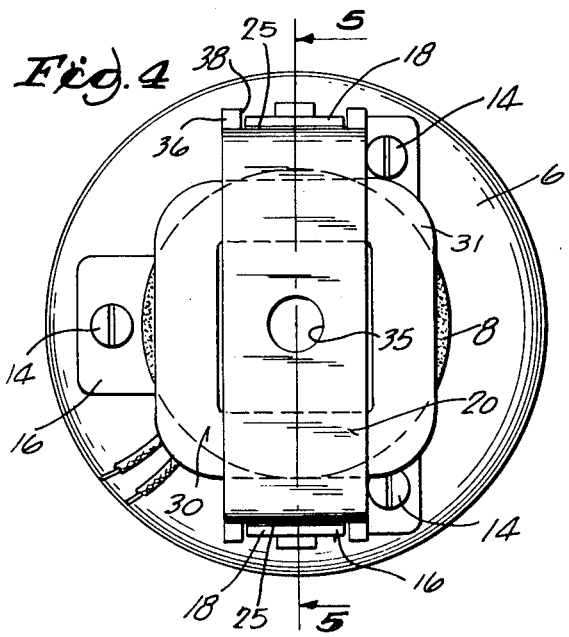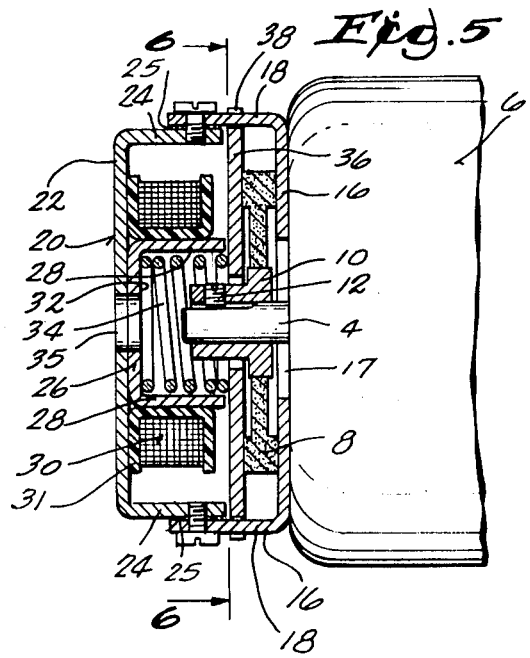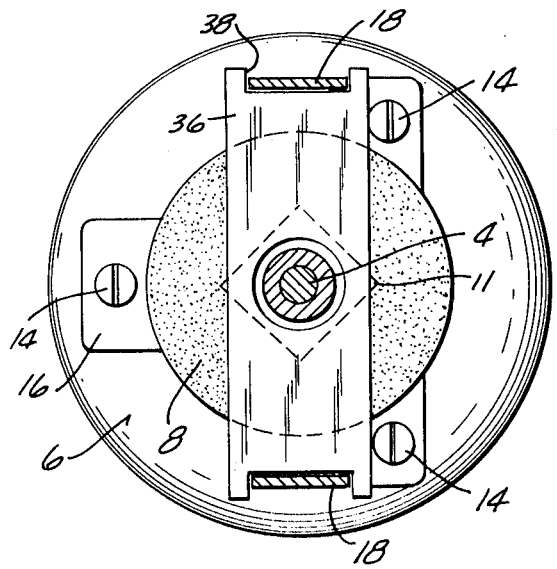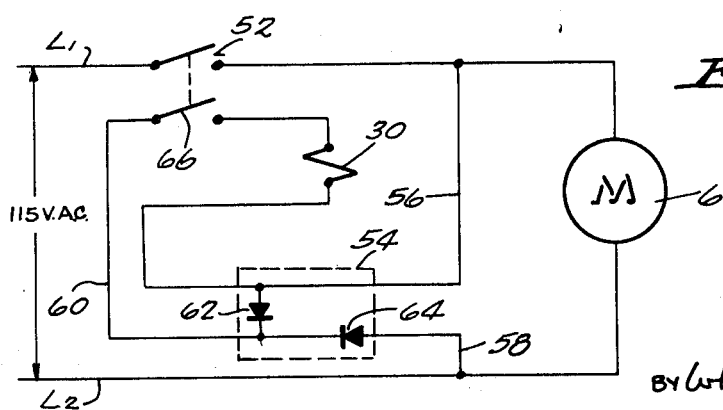

3,605,958
SPRING-APPLIED, ELECTRICALLY-RELEASED BRAKE
Richard H. McCarthy, Milwaukee, Wis., assignor to Stearns Electric Corporation, Milwaukee, Wis.
Filed Jan. 21, 1970, Ser. No. 4,640
Int. Cl. F16d 65/24
U.S. Cl. 188—171
10 Claims

ABSTRACT OF THE DISCLOSURE

A brake disk connected to rotate with a shaft is confined between a mounting plate and an armature plate. In one embodiment, the disk is fixed to the shaft. In another and preferred embodiment, the disk floats and may be clamped between said plates. The mounting plate has arms on which the armature plate is guided; a core frame connected with such arms comprises long and short straps fastened together and providing inner and outer poles between which a spool carries the magnetic winding. A compression spring engaging the shorter strap between the inner poles serves to bias the armature plate toward engagement with the brake disk. When the winding is energized the several poles attract the armature plate to release the disk.

BACKGROUND OF THE INVENTION

Brakes which are spring-applied and magnetically released are well-known in the art. They are commonly wired to energize the retracting magnet when the motor is energized. The constructions previously employed have been relatively expensive. The objective of the present invention is to produce a highly effective structure of this type which can be made with unusual economy.

Cross reference is made to co-pending application Ser. No. 785,998, filed Dec. 23, 1968, and entitled "Spring-Applied, Electrically-Released Brake," and which is being allowed to become abandoned through failure to file a response to the action of Apr. 24, 1970.

SUMMARY OF THE INVENTION

Four poles are made of outer and inner core straps of magnetic iron or steel, all straps having inwardly turned legs and those of the inner strap being spaced from those of the outer strap sufficiently to provide slots in which a pre-wound winding is received. The device is illustrated and described as being mounted on the shell of an electric motor but it will be understood that this is merely typical of the usage to which it is put.

A bracket having apertures for mounting bolts attaching it to the motor shell is provided with arms connected to the outer polar legs in the form of a generally rectangular frame. Guided on this frame are the notched extremities of an armature which also serves as a brake plate movable along the bracket arms or other guiding frame elements to and from engagement of its face with a disk which may be fixed to the shaft but preferably floats on the armature shaft of the motor and rotates therewith. Within the inner strap member is a compression spring biasing the brake plate toward the disk. In the preferred construction, the disk is clamped between the brake plate and the mounting plate to brake the shaft when the magnet is deenergized. The several legs of the inner and outer polar strap members provide four diametrically spaced poles toward which the armature is retracted when the winding is energized. For economy purposes, the bracket and its arms may be made of ordinary steel because the polar legs with which these arms are connected are of like polarity. Hence, there is very little flux leakage through the bracket.

A special circuit is preferably used to rectify alternating current for the energization of the coil windings on the spool.

BRIEF DESCRIPTION OF THE DRAWINGS

FIG. 1 is a view in side elevation of a motor equipped with a brake according to the present invention, portions being broken away.

FIG. 2 is a fragmentary end elevation of the brake appliance as it appears when removed from the motor shell, portions being broken away.

FIG. 3 is a relatively enlarged detail view showing in mutually separated positions the component parts of the brake assembly.

FIG. 4 is a view in elevation of a preferred brake construction embodying the invention.

FIG. 5 is a view in section on the line 5—5 of FIG. 4.

FIG. 6 is a view in section on the line 6—6 of FIG. 5.

FIG. 7 is a circuit diagram showing a preferred means for energizing the magnet.

DETAILED DESCRIPTION

The motor armature shaft 4 projects in the usual manner from the end of a motor shell fragmentarily illustrated at 6. Brake disk 8 may have its hub 10 secured to the shaft by a set screw 12 as shown in FIG. 1, or it may be constrained to rotate with the shaft although it may float axially of the shaft on a polygonal hub 11 as shown in FIG. 5. The disk 8 may be either of magnetic or non-magnetic material. In practice, it is made of aluminum alloy (FIG. 3) or of non-metallic asbestos or the like (FIG. 5) to reduce its momentum and hence to reduce the load on the brake.

Attached to the motor shell by means of machine screws 14 is a bracket plate 16 which has a hole 17 for the shaft 4 and is provided with arms 18 projecting away from the motor shell and attached to the core 20 for mounting the polar assembly and the operating coil.

The polar assembly comprises an outer core strap 22 with polar ends to which the bracket arms are fastened. The polar ends 24 of the strap 22 are bent at right angles to extend toward the motor shell along the arms 18 and are substantially in parallelism with each other. With the bracket plate, the core assembly has the form of a rectangular frame. Welded or otherwise secured within the outer core strap 22 is an inner core strap 26 similarly provided with polar ends 28 bent at right angles to project in parallelism with each other toward the motor shell. All four of the polar extremities 24 and 28 preferably terminate in the same plane normal to the axis of the armature shaft 4.

The channel formed by the spaced inner and outer poles 24 and 28 receives a winding 30 for magnetizing the several poles, the inner poles 28 being energized oppositely to the outer poles 24.

The central portion of the inner core strap 26 between legs 28 provides at 32 a seat for a compression coil spring 34. The shaft acted on by the brake may be as long as desired, since the spring seat 32 has a hole 35 through which a long shaft may project. Spring 34 biases an armature and brake plate 36 away from the poles but yieldably accommodates movement of the plate toward the poles when the plate is magnetically attracted when the magnet winding 30 is energized. The ends of the plate 36 are notched at 38 for guidance on the frame, i.e., the arms 18 of the bracket 16. If the disk is fixed to the shaft, either the disk 8 or the armature plate 36 (preferably the latter) may desirably be provided with brake facing 40 (FIG. 3) However, in the preferred construction of FIGS. 5 and 6, the disk floats on the shaft and the entire disk is made of non-metallic material and is clamped between plate 36 and mounting plate 16 (FIG. 5) when the magnet is deenergized.

Short circuiting of the flux path through the armature plate 36 is avoided and there will be almost no flux leakage because the arms 18 of bracket 16 are of like polarity, being connected to poles of like polarity. Desirably, however, shims 25 of non-magnetic material are interposed between the polar arms 24 and the bracket arms 18. The bracket 16 and the polar assembly 22, 26 need not be heavy because they comprise a very stiff rectangular frame unit which is not subject to any substantial deformation in use, the movement of the brake plate and armature being rectilinear axially of the armature shaft 4.

When the magnet is energized, the combination brake and armature plate is drawn to the poles 24 and 28 against the bias of spring 34 and the friction on disk 8 is relieved. The spring 34 is positioned between the vertically spaced polar arms 28 and between the sides of the coil 30 or coil bobbin 31.

The circuit shown in FIG. 7 shows a preferred means of controlling the brake. Alternating current supplied through line conductors L-1 and L-2 will energize the motor 6 when the switch 52 is closed. At the same time the magnetic winding 30 of the brake will be energized by direct current which is provided by a rectifier 54. Through the connector 56 and connector 58 the respective diodes 62 and 64 are connected respectively with A.C. supply lines L-1 and L-2. The other sides of the respective diodes are connected by conductor 60 through contact 66 of switch 52 to the winding 30. Since the switch contact 66 controls direct current, there is an immediate magnet response which would be impossible if the switch controlled only A.C. current.

What is claimed is:

1. A brake unit applicable to a member having a shaft and comprising a bracket plate having means for connection to said member and having spaced arms projecting away from said means, said plate being further provided with an opening for said shaft, a magnetic core assembly comprising a strap connected with respective arms and having an intermediate portion extending therebetween and having first poles projecting along said arms toward said bracket plate, a second strap having an intermediate portion connected with the first mentioned strap and having second poles spaced from each other and from the poles of the first mentioned strap and projecting toward said bracket plate, a winding disposed between the first and second poles and encircling the second poles and adapted when energized to magnetize all of the poles to impart like polarity to the first poles and to render each of the second poles opposite in polarity to the first poles, a brake disk spaced from said poles, a brake plate and armature fixed against rotation and having means supporting it for movement axially of said shaft, said plate being interposed between the brake disk and the several said poles and subject to attraction by the poles when said winding is energized, and a compression spring seated against the second strap and between the second poles and engaging said plate for biasing said armature toward said disk.

2. A brake unit according to claim 1 in which the intermediate portion of the second strap is in substantial face contact with the first strap, the means connecting the second strap with the first strap including welds, said assembly having straps of dual thickness between the second poles and of single thickness from the second poles past said winding to said first poles.

3. A brake unit according to claim 1 in which said bracket plate comprises a fixed brake plate between which and said armature plate said disk is clamped by the bias of said spring on the armature plate when said winding is deenergized, the brake disk having means mounting it for rotation with said shaft and for accommodating axial movement of the brake disk along said shaft toward and from said fixed brake plate.

4. A brake unit according to claim 1 in which the said disk is fixed to said shaft and the brake plate and armature has brake facing means mounted thereon at spaced locations on opposite sides of the axis of said disk, the brake facing means being adapted to engage said disk subject to the bias of said spring when said winding is deenergized.

5. A brake unit according to claim 1 in which the arms of the bracket plate together with said magnetic core assembly constitute a generally rectangular frame with spaced sides, the brake plate and armature having notched ends engaging portions of said frame sides for guidance thereon.

6. A brake unit according to claim 5 in which the spaced sides of said frame which provide portions for the guidance of said brake plate comprise arms of the bracket plate, the first said poles of the core assembly being substantially parallel to said bracket arms and disposed within the bracket arms and terminating short of the range of movement of the brake plate and armature.

7. A brake unit according to claim 5 in which nonmagnetic shims intervene between the arms of the bracket plate and the poles which project along said arms toward the bracket plate.

8. A brake unit according to claim 1 in which the bracket plate is provided with corners on one side thereof with openings through which extend two of the means connecting the bracket with the member, said plate having a lateral extension provided with an opening in which is disposed another of said means for connecting the bracket to the member, the said arms projecting from said plate intermediate the several openings and being substantially diametrically spaced from each other across the shaft.

9. A combination according to claim 1 in which lines comprising opposite sides of an A.C. circuit are connected through a switch with a motor of which the shell constitutes the aforesaid member, and means including a rectifier connected across said lines between the switch and the motor and having a circuit including a second contact of said switch for energizing said winding.

10. A combination according to claim 9 in which said rectifier comprises diodes connected to the respective lines and having an output conductor leading to the second contact of said switch.

References Cited

UNITED STATES PATENTS

| 2,217,464 | 10/1940 | Arnold | 188—171 |
| 2,297,704 | 8/1942 | Lillquist | 188—171 |

DUANE A. REGER, Primary Examiner

U.S. Cl. X.R.

188—72.3